(12) United States Patent
Foulon, Jr. et al.

(10) Patent No.: US 7,487,718 B2
(45) Date of Patent: Feb. 10, 2009

(54) PLATFORM FOR CONVEYOR SYSTEM

(75) Inventors: Gilbert M. Foulon, Jr., Wanaque, NJ (US); Thomas G. Berger, Ridgefield, NJ (US); Moysey Shtilerman, Elmwood Park, NJ (US)

(73) Assignee: Solbern LLC, Fairfield, NJ (US)

( * ) Notice: Subject to any disclaimer, the term of this patent is extended or adjusted under 35 U.S.C. 154(b) by 756 days.

(21) Appl. No.: 11/027,393

(22) Filed: Dec. 30, 2004

(65) Prior Publication Data

US 2006/0144254 A1 Jul. 6, 2006

(51) Int. Cl.
*A21C 9/06* (2006.01)
*A21C 9/08* (2006.01)
*A23P 1/00* (2006.01)

(52) U.S. Cl. ............................ 99/450.6; 426/502
(58) Field of Classification Search ............... 99/450.6
See application file for complete search history.

(56) References Cited

U.S. PATENT DOCUMENTS

| | | | |
|---|---|---|---|
| 2,574,548 A * | 11/1951 | Deutsch | 99/450.1 |
| 2,855,867 A * | 10/1958 | Zeitlin | 99/450.6 |
| 3,669,007 A | 6/1972 | Pulici | |
| 3,745,911 A * | 7/1973 | Kennedy et al. | 99/426 |
| 3,912,433 A | 10/1975 | Ma | |
| 3,920,440 A | 11/1975 | Takaoka et al. | |
| 4,084,493 A | 4/1978 | Quintana | |
| 4,388,059 A | 6/1983 | Ma | |
| 4,393,758 A | 7/1983 | Anmahian | |
| 4,457,225 A | 7/1984 | Bakker | |
| 4,483,242 A | 11/1984 | Goodman et al. | |
| 4,516,487 A | 5/1985 | Madison et al. | |
| 4,608,919 A | 9/1986 | Prows et al. | |
| 4,638,729 A | 1/1987 | Woodworth et al. | |
| 4,691,627 A | 9/1987 | Roberts | |
| 4,913,043 A | 4/1990 | Cheung | |
| 4,938,981 A | 7/1990 | Hee | |
| 4,961,948 A | 10/1990 | Hee | |
| 5,085,138 A * | 2/1992 | Fehr et al. | 99/450.6 |
| 5,263,407 A | 11/1993 | Pomara, Jr. | |
| 5,405,256 A * | 4/1995 | Dalton | 425/343 |
| 5,912,035 A | 6/1999 | Grat | |
| 2006/0107846 A1 | 5/2006 | Foulon, Jr. et al. | |

* cited by examiner

*Primary Examiner*—Joseph M Pelham
(74) *Attorney, Agent, or Firm*—McCarter & English, LLP

(57) ABSTRACT

An improved platform for use with a conveyor system used in the automated formation of folded food products such as burritos, taquitos and the like. The platform includes a substantially planar base and an articulated flap having pivotally connected upper and lower members. The articulated flap rotates with respect to the base to fold the shell of the food product once. The upper member of the articulated flap rotates with respect to the lower member to create a pinch-like subsequent fold in the previously folded shell, which secures the filling within the initial enclosure. The platform may also include additional, rigid flaps for making additional folds after the upper member makes the pinch-like fold. Once the final fold is made, the partially-folded food product may be securely transferred to the mechanism for finalizing the folding and production thereof.

28 Claims, 8 Drawing Sheets

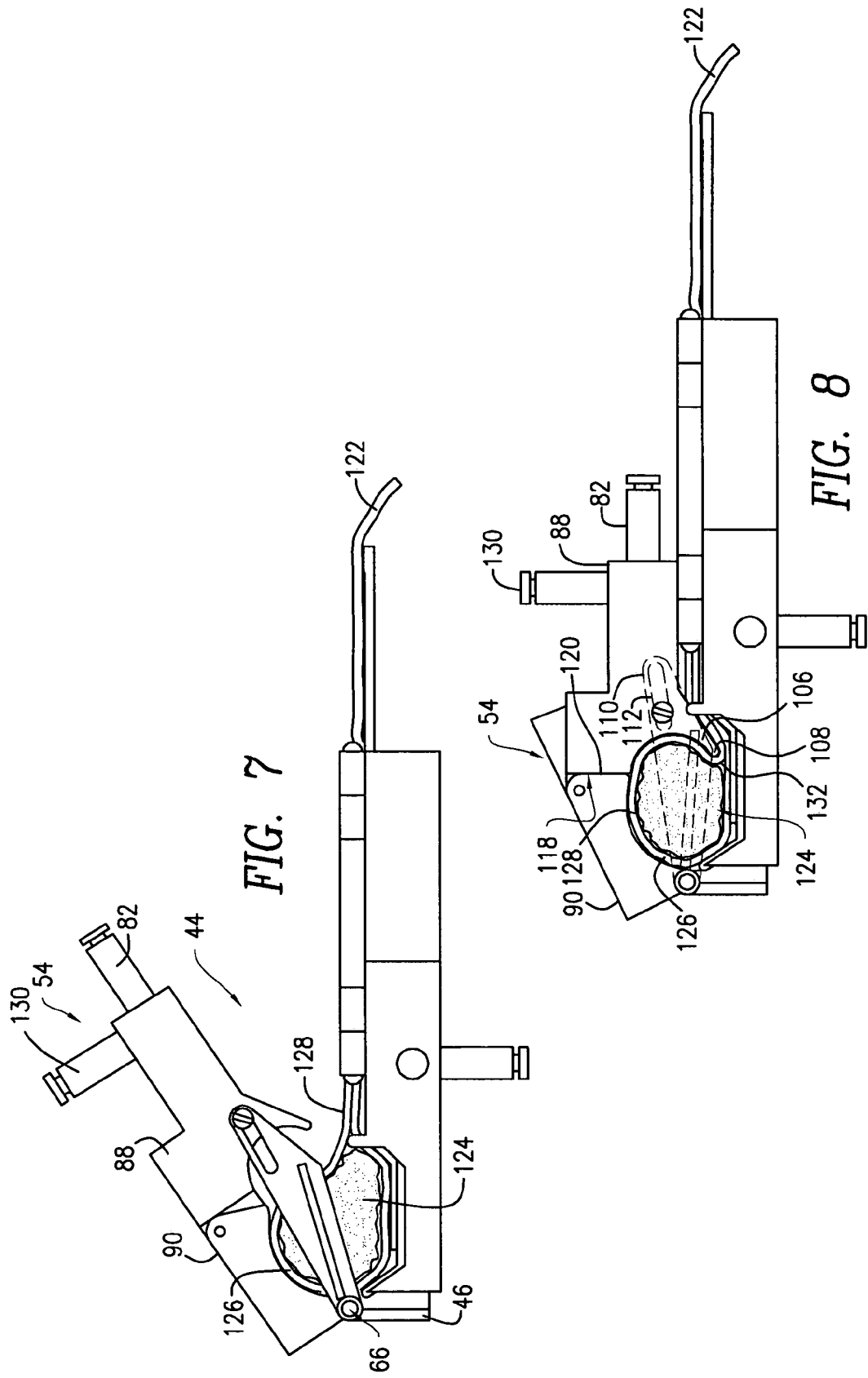

PLATFORM FOR CONVEYOR SYSTEM

FIELD OF THE INVENTION

The present invention relates to an improved platform used in the automated formation of folded food products, such as burritos, taquitos and the like.

BACKGROUND OF THE INVENTION

Apparatus for forming folded food products are known (see, for instance, the machine described in U.S. Pat. No. 5,912,035, the disclosure of which is incorporated herein by reference in its entirety). In the burrito-folding machine and associated method of the '035 Patent, which is owned by the assignee of the present application, a tortilla (or shell) is placed upon a substantially circular folding platform 10, such as is shown in FIG. 1, for subsequent filling and folding steps. The folding platform 10 includes a substantially planar base 12, a first flap 14 pivotally mounted to the base 12 via a first hinge 16, a second flap 18 pivotally mounted to the base 12 via a second hinge 20, and a third flap 22 pivotally mounted to the base 12 via a third hinge 24. The folding platform 10 further includes a channel-shaped depression 26 formed from corresponding portions of the base 12 and the second and third flaps 18, 22.

Referring to FIG. 2a, filling and folding of a tortilla 28 begins with the tortilla 28 being placed or draped on the folding platform 10 in a more or less centered position, after which a portion 30 of a food filling is deposited on the tortilla 28 above the approximate location of the depression 26 in the base 12. As shown in FIG. 2b, the first flap 14 of the folding table 10 is initially actuated by being rotated/overturned about the first hinge 16 in a pivoting motion (not shown) with respect to the base 12, after which the first flap 14 is returned to its starting position shown both in FIG. 1 and FIG. 2b. This causes a first side 32 of the tortilla 28 to be folded more or less entirely over the food filling portion 30, thereby creating a first fold 34 in the tortilla 28. Next, and as shown in FIG. 2c, the second and third flaps 18, 22 of the folding table 10 are actuated by being rotated/overturned about their respective second and third hinges 20, 24 in separate sequential pivoting motions (not shown) with respect to the base 12, after which the second and third flaps 18, 22 are returned to their starting positions (shown in both FIG. 1 and FIG. 2c). These actuations cause opposite second and third sides 36, 38 of the tortilla 28 to be folded both toward each other and on top of the previously-folded first side of the tortilla 28, thereby creating respective second and third folds 40, 42 in the tortilla 28. A conveyor (not shown) carries the partially-folded burrito to an adjustable driven roller (not shown) that applies slight pressure to (i.e., pinches) the partially-folded burrito. A set of folding jaws (not shown) then engages and rotates the partially-folded burrito to complete the folding of the finished burrito.

While the automated machine and method of the '035Patent alleviate many of the problems associated with manual burrito folding, other problems exist as a result of the automated operation. In particular, in the process of transferring the partially-folded burrito from the folding platform 10 to the adjustable driven roller (not shown), one or more of the folded sides 32, 36, 38 of the burrito can tend to become unfolded. Even if no unfolding occurs, the multi-step manipulation of the partially-folded burrito may dislodge some of the filling from the unfolded side of the burrito (i.e., the side opposite the first side 32). Either of these occurrences can result in the inferior or incomplete wrapping of the burrito, thereby compromising the automated burrito-making process.

SUMMARY OF THE INVENTION

The object of the present invention is to provide a folding platform that more securely prepares partially-folded food products prior to the final folding stages and completion thereof, while also simplifying and facilitating the more efficient production of folded food products.

To accomplish the above object, the present invention provides a folding platform for use with a conveyor system used in the automated formation of folded food products. The folding platform includes a substantially planar base and at least one flap pivotally connected to the base for folding the shell of a folded food product (i.e., a tortilla or taquito wrapper) about a food filling deposited therein. The flap is articulated, and includes upper and lower members which are pivotally connected to each other to facilitate a double-fold operation. The first fold is accomplished by rotating the articulated flap towards the base to create an initial enclosure of the filling within the folded shell. The second fold is accomplished by further rotating the upper flap member of the articulated flap with respect to the lower flap member to create a pinch in the folded shell that secures the filling within the initial enclosure. Once the pinch is made, the partially-folded food product may be securely transferred to the mechanism for finalizing the folding of the products.

The first disclosed embodiment of the present invention includes two rigid flaps, in addition to the articulating flap, all of which are pivotally connected to and substantially coplanar with the base of the folding platform. The base includes a depression, which contains the food product during folding, and a lifting member, which transfers the partially-folded food product. This embodiment is ideal for the production of burritos, or larger food products. The articulated flap is rotated towards the base to create the first fold in the shell. The lower flap member and the base include opposing contact surfaces adjacent their pivoting interface which meet in a stopping arrangement so as to limit the degree to which the lower flap member can rotate toward the base. A second, "pinch-like" fold is made upon further rotation of the upper flap member towards the base, without further rotation of the lower flap member. A ridge on the upper flap member engages the once-folded shell to impart the pinch-like second fold. After completion of the second fold, each of the rigid flaps rotates towards the base to create sequential third and fourth folds in opposite ends of the shell, substantially perpendicular to the first and second folds. Followers are placed on multiple surfaces of the articulated and rigid flaps. As the folding platform is moved along a conveyor, a rod-like cam or other automated lifting mechanism engages the followers to lift the various flaps into their respective folding positions, and then move them in the opposite direction to return the flaps to their original position.

The second embodiment of the present invention is similar in structure, construction and operation to the first embodiment, e.g., in that it includes an articulated flap and a base, but with some differences as well. For example, the second embodiment lacks the rigid flaps for forming end folds, making it better-suited to the production of small, open-ended products, such as taquitos. Further, the contact surfaces which form the stopping arrangement for preventing over-rotation of the first flap member towards the base are not located adjacent the pivoting interface between the first flap member and the base. Rather such contact surfaces are located at some distance therefrom, including at least one contact surface formed by an external surface of an extension of a pintle forming part of a hinge between the first and second flap members.

BRIEF DESCRIPTION OF THE DRAWINGS

The above and other objects, features and advantages of the present invention will be apparent from the following detailed description of the following exemplary embodiments of the invention considered in conjunction with the accompanying drawings, in which:

FIG. 7 is a side elevational view of the folding platform of FIGS. 3 and 5 with the articulated first flap in its first folding position (as shown in the FIG. 6 top plan view);

FIG. 8 is a side elevational view of the folding platform of FIGS. 3 and 5 with the articulated first flap in its second folding position;

DETAILED DESCRIPTION OF THE INVENTION

Figure 3:
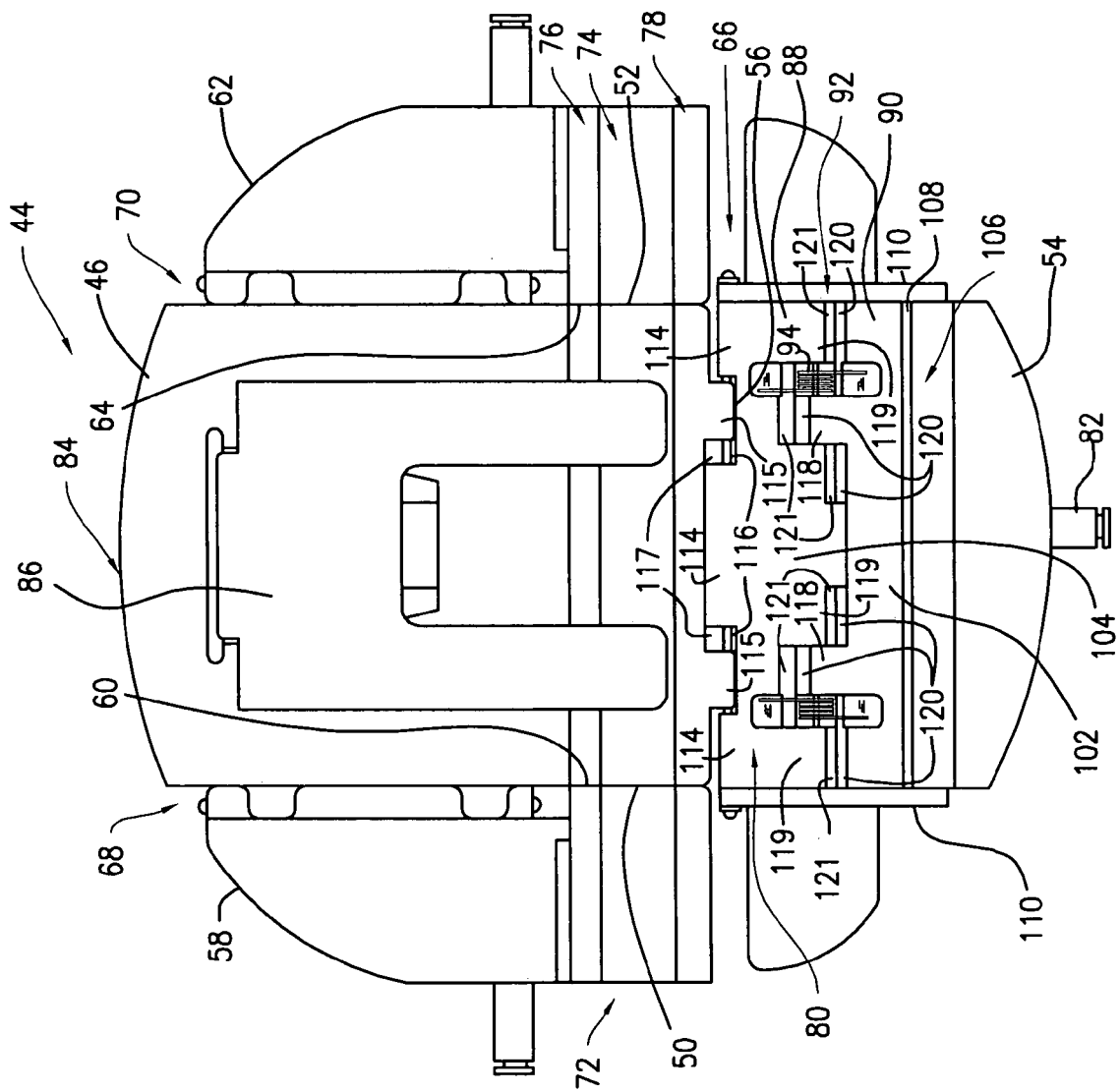
FIG. 3 is a top plan view of a folding platform constructed in accordance with a first exemplary embodiment of the present invention.
Figure 4:
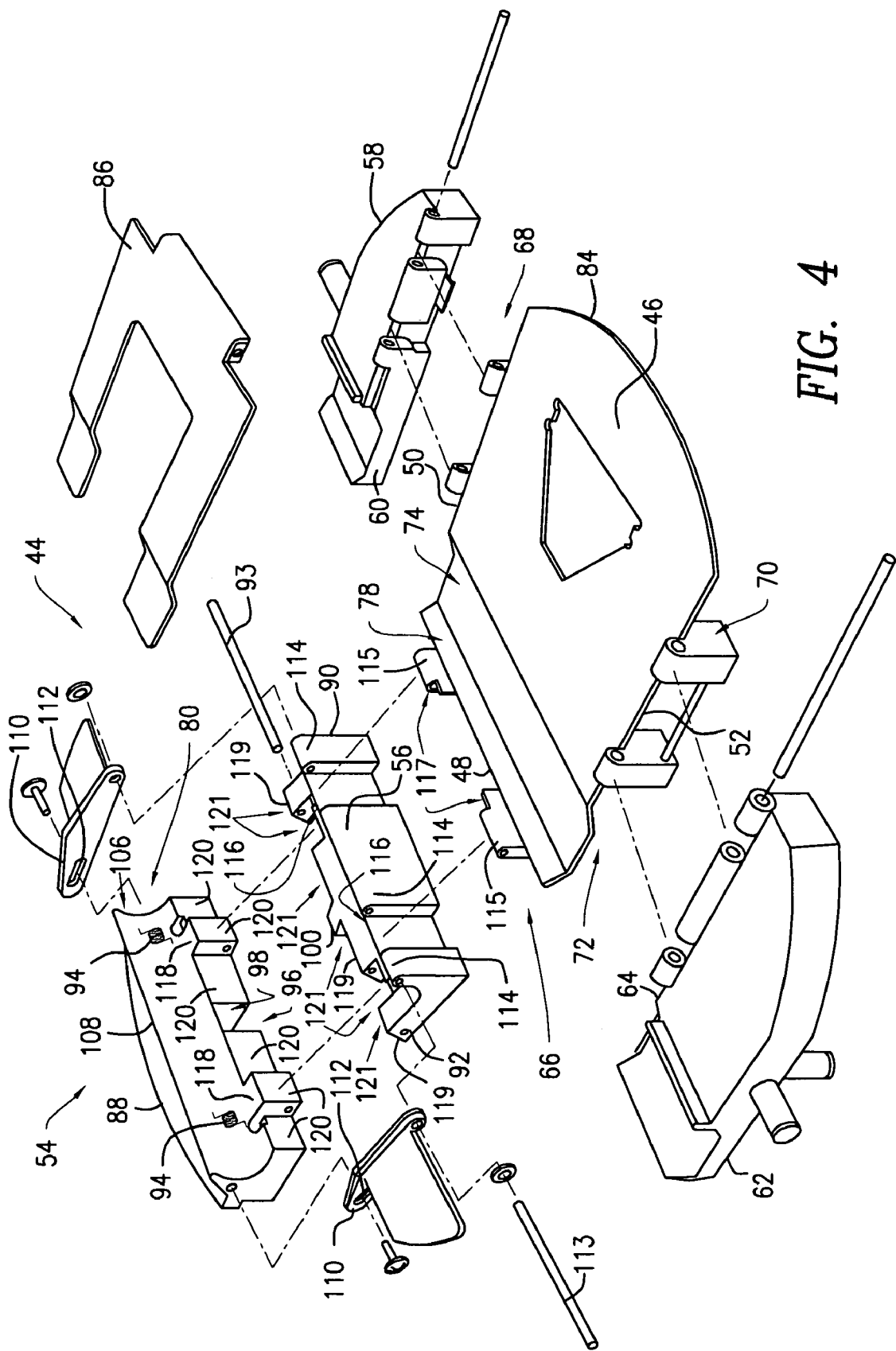
FIG. 4 is an exploded, top perspective view of the folding platform of FIG. 3.

A first embodiment of the present invention is shown in FIGS. 3-10. Referring to FIGS. 3 and 4, a substantially circular folding platform 44 is shown. The folding platform 44 includes a substantially planar base 46 having first, second and third linear edges 48, 50, 52, respectively; a first flap 54 having a linear edge 56; a second flap 58 having a linear edge 60; a third flap 62 having a linear edge 64; and first, second, and third hinges 66, 68, 70 respectively disposed between the first, second, and third linear edges 48, 50, 52 of the base 46 and the linear edges 56, 60, 64 of the first, second, and third flaps 54, 58, 62. The first, second, and third flaps 54, 58, 62 are pivotally mounted to the base 46 via the first, second, and third hinges 66, 68, 70, respectively. The second and third linear edges 50, 52 of the base 46 are substantially parallel to each other, and each one is each substantially perpendicular to the first linear edge 48 of the base 46. The folding platform 44 further includes a channel-shaped depression 72 formed from corresponding portions of the base 46 and the second and third flaps 58, 62. The depression 72 consists of a bottom surface 74 and first and second beveled side walls 76, 78, respectively. The first flap 54 includes a pocket 80 and a first follower 82 that extends beyond the periphery of the first flap 54. The base 46 further includes a distal edge 84, which is opposite the first linear edge 48, and a lift arm 86, which is pivotally mounted on the base 46 in the vicinity of the distal edge 84.

Referring to FIGS. 3 and 4, the first flap 54 includes cooperating first and second flaps, such as, for example, cooperating lower and upper flap members 88, 90 that are pivotally connected to each other about a fourth hinge 92 disposed between the upper and lower flap members 88, 90. As such, the first flap 54 is distinguished from the second and third flaps 58, 62 at least in that the first flap 54 is an articulated flap, whereas the second and third flaps 58, 62 include no internal articulation. The fourth hinge 92 includes a pintle 93, and the first flap 54 is further equipped with a pair of springs 94 disposed around the pintle 93 and positioned across the fourth hinge 92 between the upper and lower flap members 88, 90. The upper flap member 88 is equipped with a cavity 96 and a reaction surface 98, while the lower flap member 90 is equipped with a stop 100. The springs 94 are mounted on the fourth hinge 92 so as to bias the reaction surface 98 of the upper flap member 90 against the stop 100 of the lower flap member 90, in which position the stop 100 occupies the cavity 96 in the upper flap member 90. The first flap 54 is therefore biased so as to assume, in the absence of a force sufficient to defeat the spring bias, a substantially flat configuration (e.g., wherein the upper and lower flap members 88, 90 occupy a common plane).

The cooperating upper and lower flap members 88, 90 include respective pocket surfaces 102, 104 which together define the pocket 80 of the first flap 54. The upper flap member 88 is further equipped with a protruding ridge 106 having an edge 108. The first flap 54 further includes a pair of guide bars 110, 110 spanning the width of the pocket 80 (i.e., from a location proximate the edge 108 of the ridge 106 to the linear edge 56 of the first flap 54 where the latter hingedly connects to the base 46). The guide bars 110, 110 are disposed at opposite ends of the ridge 106, and thereby define respective lengthwise ends of the pocket 80.

The shape of the pocket 80 (i.e., as viewed in the direction of the first and fourth hinges 66, 92) changes depending on the positions of the upper and lower flap members 88, 90 relative to each other. The distance between the ridge 106 of the upper flap member 88 and the linear edge 56 of the first flap 54 therefore tends to change in relation to the changes in the shape of the pocket 80. For this reason, the guide bars 110, 110 are pivotally connected to the lower flap member 90 and have a sliding (i.e., via a slot 112) and pivoting connection with the upper flap member 90. The guide bars 110, 110 help to guide and coordinate the movements of the upper and lower flap members 88, 90 relative to each other. The structure and function of the first flap 54 will be discussed in more detail hereinafter.

The first hinge 66 of the folding platform 44 is equipped with a pintle 113, three knuckles 114 on the linear edge 56 of the first flap 54, two knuckles 115 on the first linear edge 48 of the base 46, and contact surfaces 116, 117 on one of the knuckles 114 and on two of the knuckles 115, respectively, which engage with each other when the lower flap member 90 rotates sufficiently toward the depression 72 in the base 46. More specifically, and referring in particular to FIG. 3, the contact surfaces 116 of the lower flap member 90 and the contact surfaces 117 of the base 46 are part of the first hinge 66 and serve to limit the movement of the lower flap member 90 toward the depression 72 in the process of creating a first fold, as described in more detail hereinafter. In addition, the fourth hinge 92 of the folding platform 44 is equipped with two knuckles 118 on the upper flap member 88, three knuckles 119 on the lower flap member 90, and contact surfaces 120, 121 on and adjacent to the knuckles 118, 119, respectively, which engage with each other to prevent over-rotation of the upper flap member 88 with respect to the lower flap member 90 in a direction opposite the bias direction of the springs 94. The significance of these and other features of the folding platform 44 will be discussed in more detail hereinafter.

Figure 1:
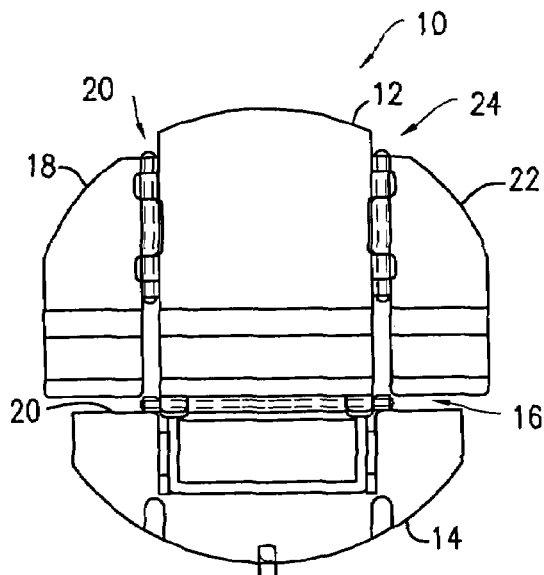
FIG. 1 is a top plan view of a folding platform according to the prior art.
Figure 2A:
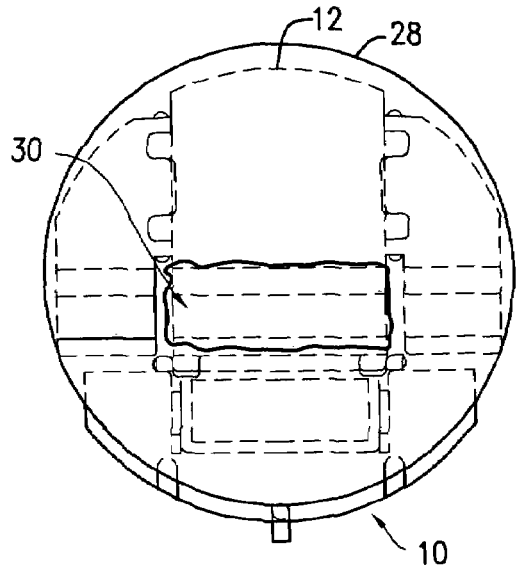
FIGS. 2a-c are views of a tortilla being placed on the folding platform of FIG. 1, filled with a food filling, and subjected to first, second and third folding operations prior to being loaded onto a conveyor for further folding to form a burrito.
Figure 2B:
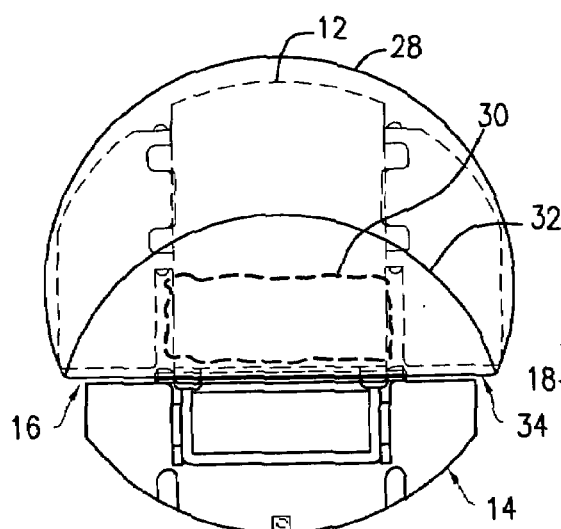
Figure 2C:
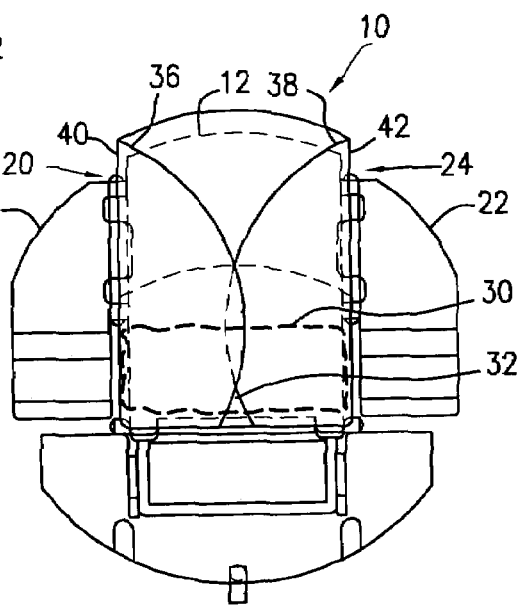

Referring to FIGS. 5-10, the folding platform 44 may be used to create all the folds described hereinabove with respect to the prior art folding platform 10 (FIGS. 1 and 2*a-c*), plus an additional fold, resembling a tuck or "pinch", extending parallel to an equivalent of the first fold 42 described in conjunction with the prior art (see FIG. 2*b*), and useful for ensuring that the food filling within the partially-folded burrito does not leak out during the many folding steps necessary to create the familiar final product.

Figure 5:
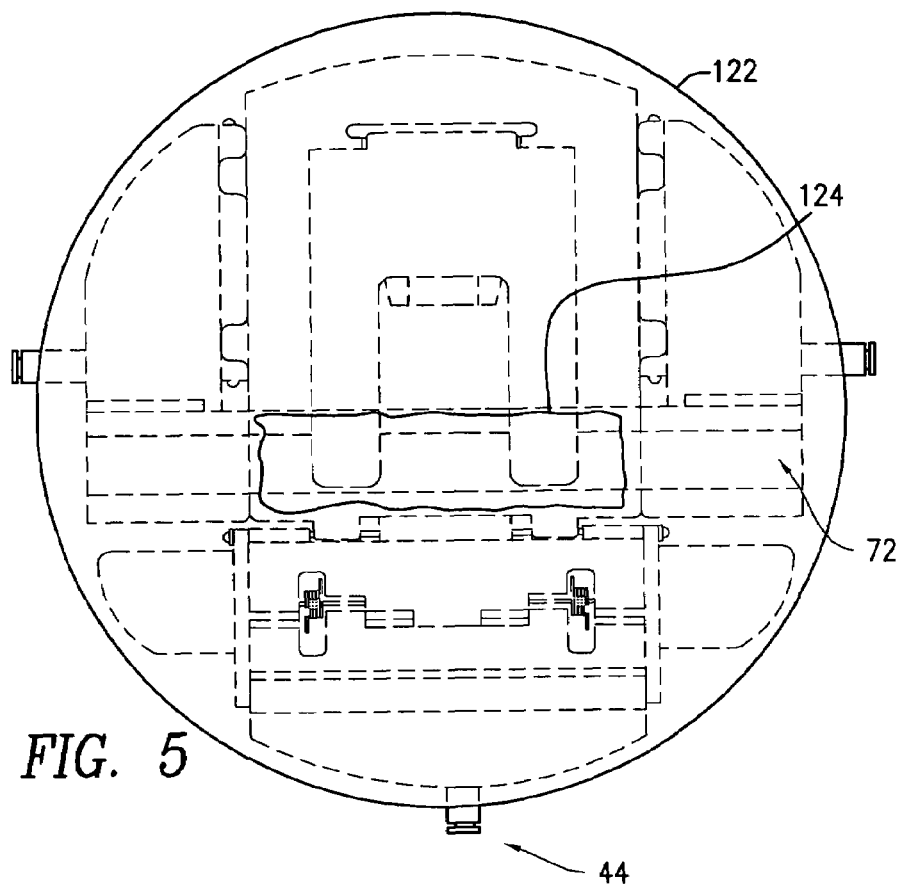
FIG. 5 is a top plan view of the folding platform of FIG. 3 in which a tortilla has been placed on the folding platform, and a food filling has been deposited on the tortilla in preparation for subsequent folding of the tortilla in accordance with the present invention.
Figure 6:
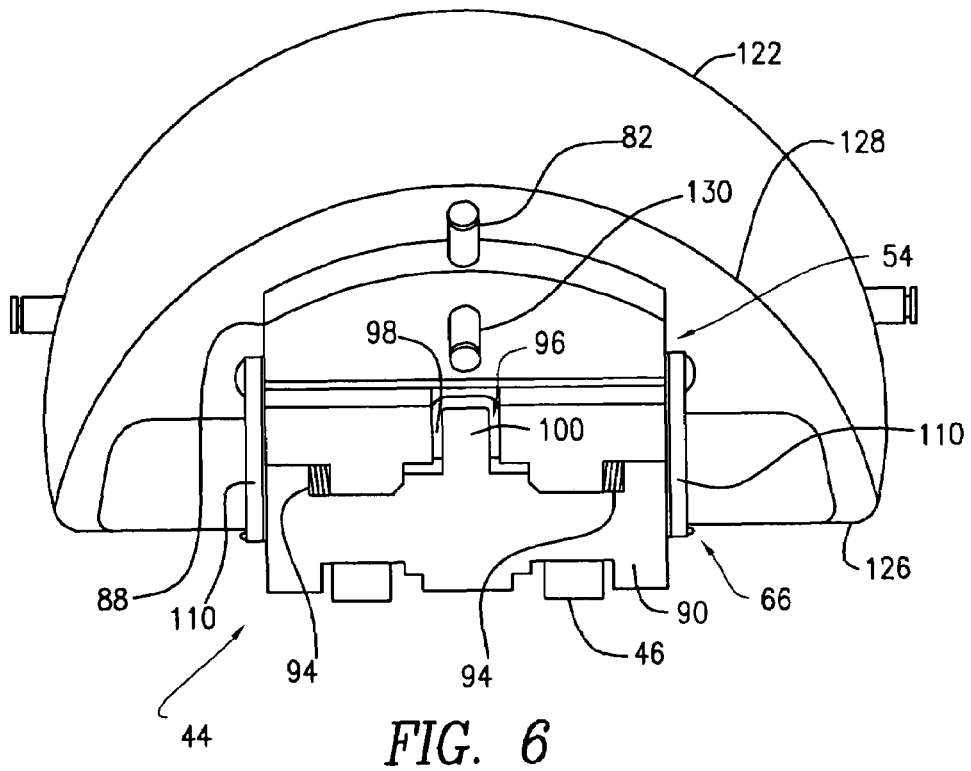
FIG. 6 is a top plan view of the folding platform of FIGS. 3 and 5 with the articulated first flap in its first folding position.

In operation, and referring initially to FIG. 5, filling and folding of a tortilla 122 begins with the tortilla 122 being placed or draped on the folding platform 44 in a more or less centered position, after which a portion 124 of food filling is deposited on the tortilla 122 above the approximate location of the depression 72 in the base 46. Conveyors (not shown), such as those of the system described in the '035 Patent, then rotate and move the folding platform 44 along a series of rod-like cams (not shown). After proper rotation of the folding platform 44 on the conveyor (not shown), the rod-like cam or other automated lifting mechanism (not shown) engages the first follower 82 mounted to the upper flap member 88. As shown in FIGS. 6 and 7, lifting of the first follower 82 rotates the first flap 54 about the first hinge 66 in a pivoting motion with respect to the base 46, ultimately causing the first flap 54 to overlay the base 46. This creates a first fold 126, whereby a first side 128 of the tortilla 122 is folded more or less entirely over the food filling portion 124 (see FIGS. 6-8).

While creating the first fold 126 as described above, the first flap 54 remains in a substantially planar orientation (i.e., the upper and lower flap members 88, 90 are kept substantially coplanar). Also, the full lengths of the guide bars 110, 110 are utilized. The bias force of the springs 94 predominates, and the stop 100 of the lower flap member 90 occupies the cavity 96 of the upper flap member 88 and abuts the reaction surface 98, keeping the first flap 54 at least temporarily rigid. Further, the corresponding contact surfaces 116, 117 (FIGS. 3-4) of the lower flap member 90 and the base 46 meet so as to limit the rotation of the lower flap member 90 toward the depression 72 (FIG. 5) to the degree shown in FIG. 7.

Following the formation of the first fold 126, a rod-like cam or other automated urging mechanism of the machine (not shown) engages either the first follower 82 or a second follower 130 (see FIGS. 6 and 7) mounted to the upper flap member 88, which causes the upper flap member 88 to continue rotating toward the depression 72 (see FIG. 5), while the orientation of the lower flap member 90 with respect to the depression 72 remains fixed. Referring to FIG. 8 (wherein the guide bar 110 is shown in phantom for the sake of clarity), as the upper flap member 88 of the first flap 54 rotates downward against the biasing force of the springs 94 (see FIG. 6), the edge 108 of the upper flap member 88 begins to tuck a portion of the first side 128 of the tortilla 122 underneath the food filling portion 124 contained within the tortilla 122. As shown in FIG. 8, when the upper flap member 88 reaches the end of its allowable range of motion in this regard (i.e., when the contact surfaces 120, 121 of the upper and lower flap members 88, 90 meet and prevent further rotation), a second fold 132 will have been formed opposite and parallel to the first fold 126, thereby creating a type of seal to keep the food filling portion 124 from leaking out of the partially-filled tortilla 122 during upcoming folding steps involving other sides of the tortilla 122. The guidebars 110, 110 accommodate the resulting decrease in distance between the ridge 106 and the first hinge 66 by means of the slot 112. In addition, the lift arm 86 can be biased (not specifically shown) so as to extend in cantilever slightly above the surface of the depression 74 so as to hold the partially-filled tortilla slightly above the depression 74. In accordance with this latter configuration, the edge 108 of the upper flap member 88 is permitted to begin folding and tucking the first side 128 of the tortilla 122 without interference from the surface of the depression 74 (i.e., with the partially-filled tortilla 122 so suspended), resulting, potentially, in the seal provided by the second fold 132 having increased integrity. The lift arm 86 flexes downward (not shown) into contact with the surface of the depression 74 via urging from the edge 108 of the upper flap member 88 as the upper flap member 88 completes its range of motion into the depression 74.

Figure 9:
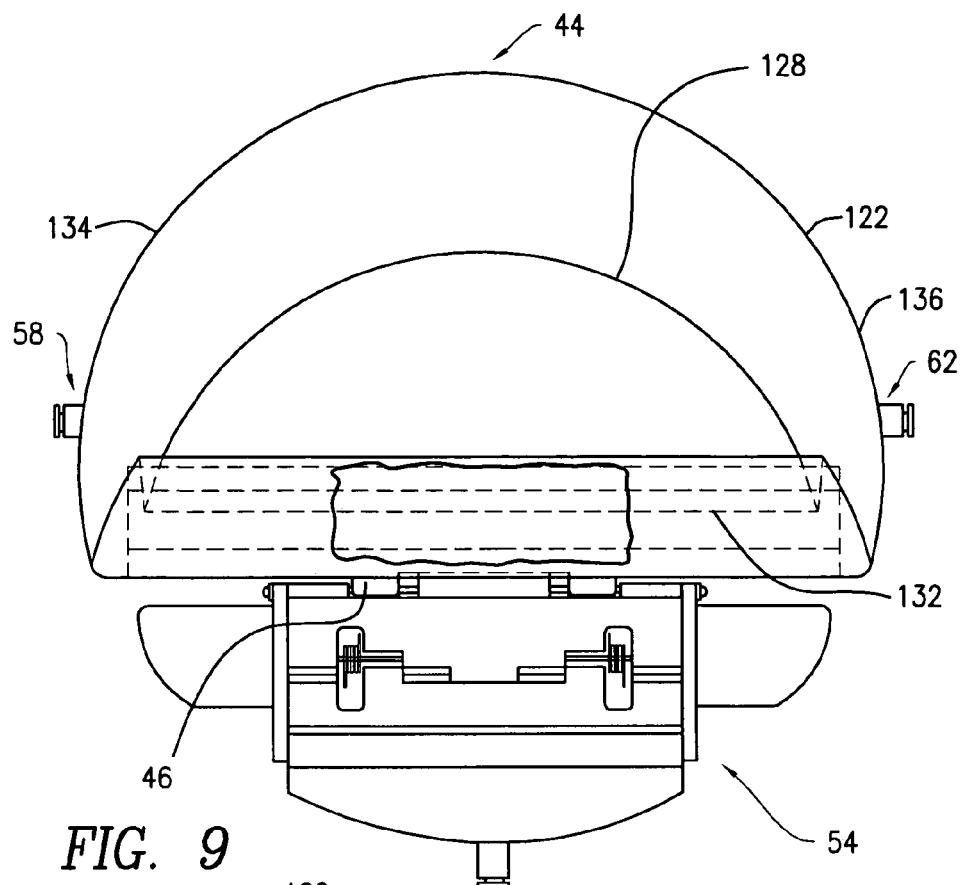
FIG. 9 is a top plan view of the folding platform of FIGS. 3 and 5 with the articulated first flap returned to its starting position after having created two folds in the filled tortilla.

After the second fold 132 is made, the first and/or second followers 82, 130 are relieved of the downward urging force. As a result, the biasing force of the springs 94 (FIG. 3), which is once again predominant, rotates the upper flap member 88 back to its coplanar position with respect to the lower flap member 90, as shown in FIG. 7. Additional urging forces applied to the first and/or second followers 82, 130 cause the first flap 54 to rotate back to its coplanar position with respect to the base 46, as shown in FIGS. 3 and 9. Referring to FIG. 9, the second fold 132 extends almost the entire width of the first side 128 of the tortilla 122. With the first flap 54 of the folding platform 44 now fully retracted, the second and third flaps 58, 62 (see FIG. 3) can now be used to respectively fold a second side 134 and a third side 136 of the tortilla 122.

Figure 10:
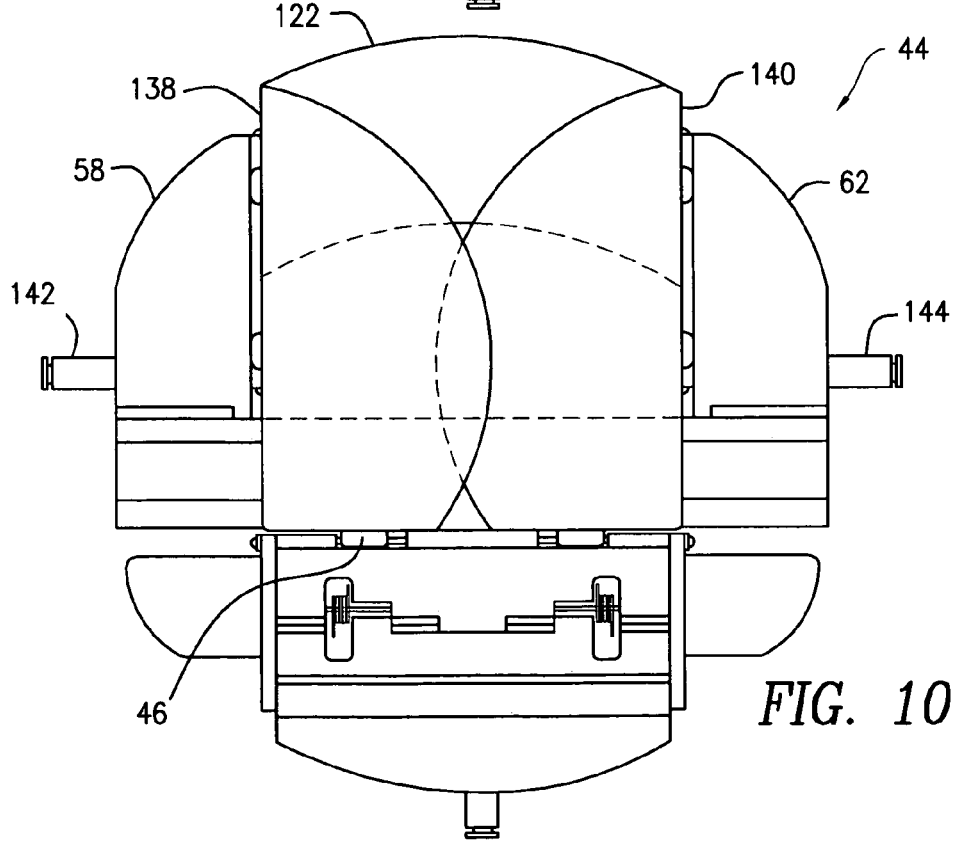
FIG. 10 is a top plan view of the folding platform of FIGS. 3 and 9 with the second and third flaps returned to their starting positions after having created respective additional folds in the filled tortilla.

As shown in FIG. 10, third and fourth folds 138, 140 of the tortilla 122 are made by action of the second and third flaps 58, 62. After proper rotation of the folding platform 44 on the conveyor (not shown), a rod-like cam or other automated lifting mechanism on the machine (not shown) engages respective third and fourth followers 142, 144 attached to the second and third flaps 58, 62, thereby causing the latter to rotate/overturn (not separately shown) with respect to the base 46 and to create the third and fourth folds 138, 140. Following the creation of the third and fourth folds 138, 140, which are perpendicular to the first and second folds 126, 132 and which overlap the first and second folds 126, 132, the second and third flaps 58, 62 are rotated away from the base 46 of the folding platform 44. The partially-folded, filled tortilla 122 is now ready for transfer from the folding platform 44 to other automated devices (e.g., an automated grip-and-flip device) for the administration of the final folding steps (not shown).

A second exemplary embodiment of the present invention is illustrated in FIGS. 11-15. Elements illustrated in FIGS. 11-15 which correspond substantially to the elements described above with reference to FIGS. 1-10 have been designated with corresponding reference numerals increased by an increment of one thousand. The embodiment of the present invention shown in FIG. 11-15 operates and is constructed consistent with the foregoing description of the folding platform 44, unless it is stated otherwise.

Figure 11:
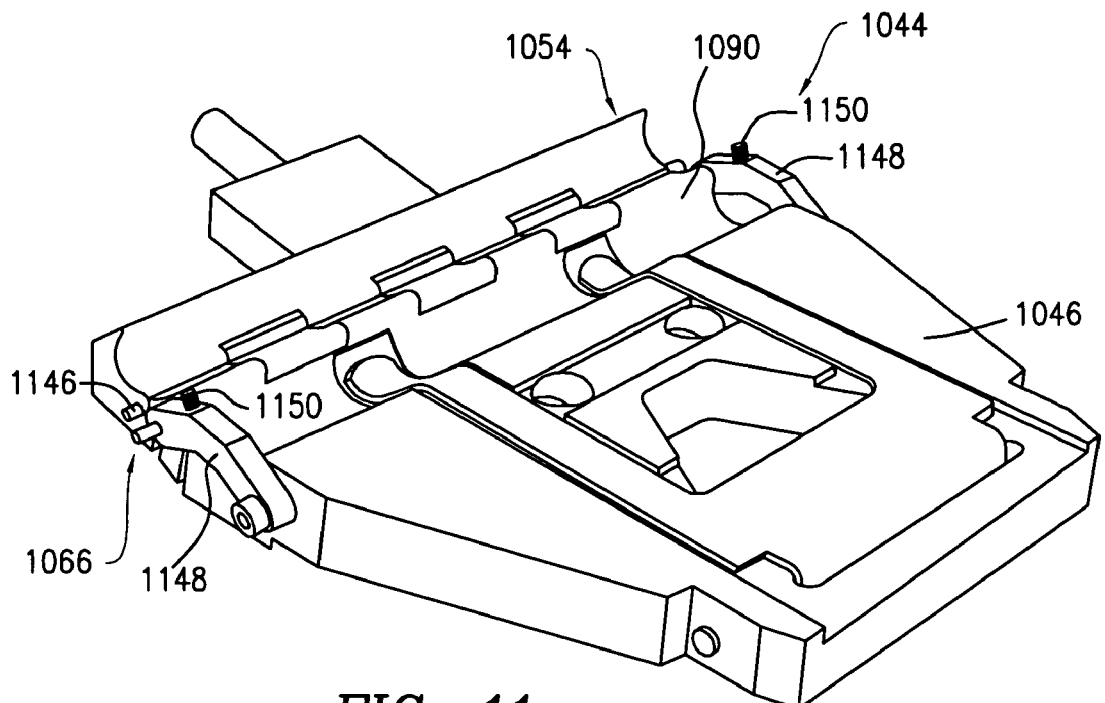
FIG. 11 is a top perspective view of a folding table for filled taquito shells constructed in accordance with a second exemplary embodiment of the present invention.
Figure 12:
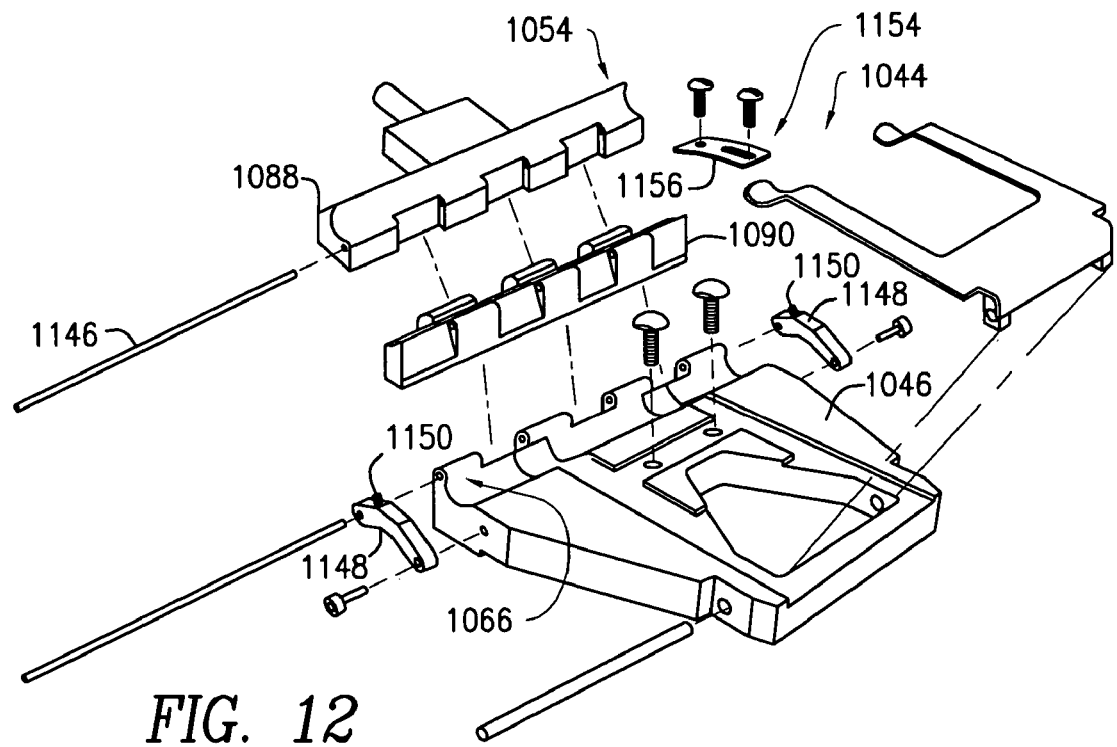
FIG. 12 is an exploded, top perspective view of the folding platform of FIG. 11.

Referring to FIGS. 11 and 12, a folding platform 1044 for filling and folding taquito shells is illustrated. The folding platform 1044 has a substantially planar base 1046 and a first flap 1054 which is articulated. However, since this embodiment is more ideal for small, open-ended folded food items, such as taquitos and the like, which have less filling and require fewer folds then a burrito, the folding platform 1044 lacks rigid second and third flaps for creating the above-described third and fourth folds.

Figure 13:
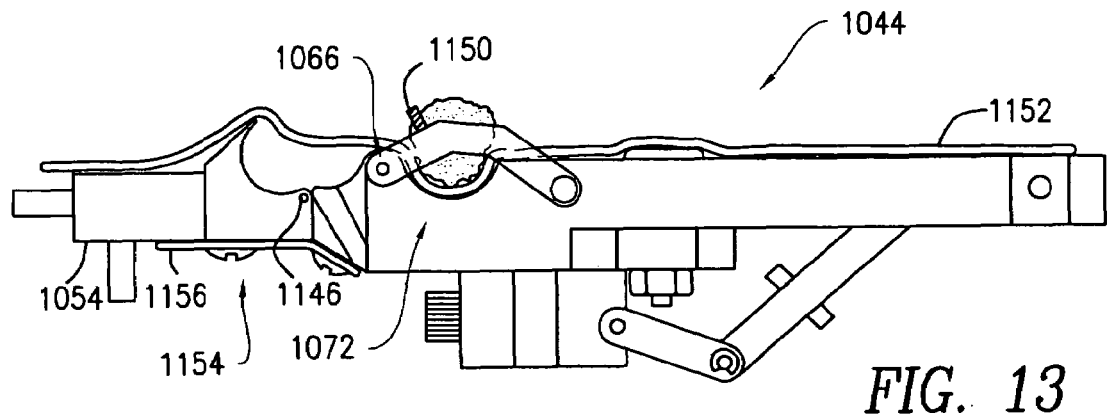
FIG. 13 is a side elevational view of the folding platform of FIG. 1 in which a taquito shell has been placed on the folding platform, and a food filling has been deposited on the taquito shell in preparation for subsequent folding of the taquito shell in accordance with the present invention.
Figure 14:
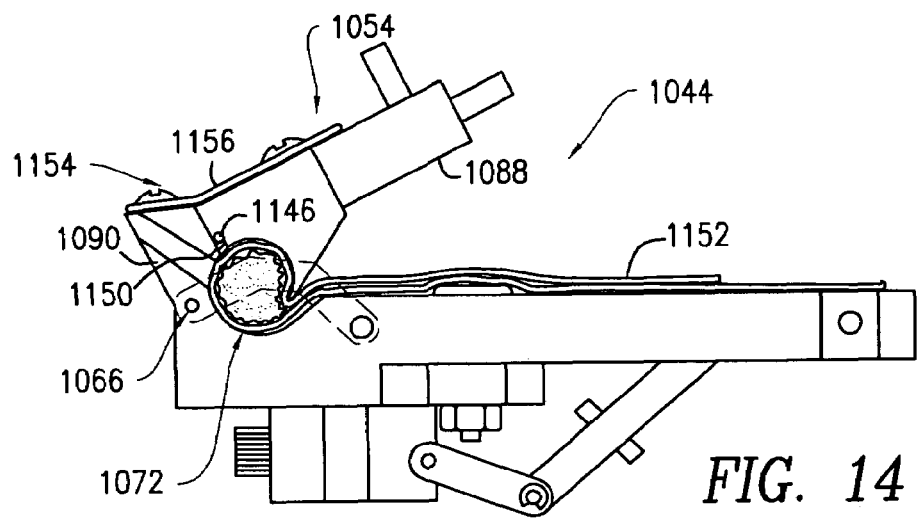
FIG. 14 is a side elevational view of the folding platform of FIGS. 11 and 13 with the articulated first flap in its first folding position.

The folding platform 1044 includes a somewhat different stop mechanism for preventing over-rotation of the lower flap member 1090 of the first flap 1054 relative to the base 1046. The first hinge 1066 includes a pintle 1146 that protrudes to a small degree from both sides of the first hinge 1066, and two brackets 1148 equipped with set screws 1150 mounted in fixed positions and extending upward from the brackets 1148. As shown in FIGS. 13 and 14, when the first flap 1054 is rotated about the first hinge 1066 toward the depression 1072, each end of the pintle 1146 rotates down until it strikes one of the set screws 1150, thereby preventing further rotation of the lower flap member 1190.

Figure 15:
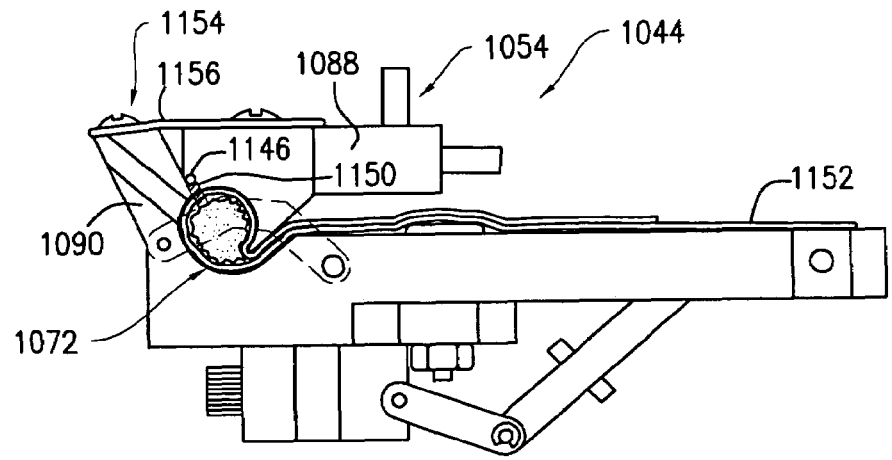
FIG. 15 is a side elevational view of the folding platform of FIGS. 11 and 13 with the articulated first flap in its second folding position.

The upper and lower flap members 1088, 1090 have no contact surfaces to prevent over-rotation of the upper flap member 1090 toward the depression 1072. However, the folding platform 1044 does include a biasing mechanism for causing the upper flap member 1088 to retract after creating a second fold 1132 in a taquito shell 1152. The biasing mechanism is not a coil spring, like the springs 94 of the first exemplary embodiment, but rather consists of a spring 1154 in the form of a steel leaf 1156 disposed between the upper and lower flap members 1088, 1090. As shown in FIGS. 14 and 15, to the extent that the upper flap member 1090 rotates downward toward the depression 1072 after the lower flap member 1088 has reached the limit of its rotation, the spring 1154 deflects, storing energy for retracting the upper flap member 1088 back into planar alignment with the lower flap member 1090, such deflection being accomplished upon the release of the upper flap member 1088 from the downward urging force.

It should be appreciated that the present invention provides numerous advantages over the prior art discussed above. For instance, the articulated first flap 54/1054 facilitates more efficient folding of food products. More particularly, the "pinch-like" fold administered to the tortilla/taquito shell by the edge 108/1108 of the ridge 106/1106 of the upper flap member 88/1088 of the first flap 54/1054 secures the food filling portion 124/1124 inside of the partially-folded food product. When the food filling portion 124/1124 is thereby secured, the lifting and transfer of the partially-folded food product from the folding platform 44/1044 to the additional conveyor (not shown) is much less likely to result in unfolding and/or loss of any of the food filling portion 124/1124.

It is also believed that the improved folding platform 44/1044 of the present invention simplifies folded food production overall. More particularly, by delivering the "pinch-like" fold to the food product, the articulated first flap 54/1054 may make later pinching by devices, such as an adjustable driven roller (not shown), unnecessary. In other words, because the pinching step is administered while the food product is still on the folding platform 44/1044, the step of transferring the partially-folded food product to the adjustable driven roller may be obviated. Once pinched, the food product can be transferred from the folding platform 44/1044 directly to folding jaws (not shown) for final folding and completion of the folded food product. Consequently, the efficiency of the folding process is enhanced.

It will be understood that the embodiments described herein are merely exemplary, and that a person skilled in the art may make many variations and modifications without departing from the spirit and scope of the invention. For example, the order of the first, second, third and fourth folds 126, 132, 138, 140 can be changed to perform the "pinch"-type fold (i.e., the second fold 132) after all the first, second and third sides 128, 134, 136 have been folded (i.e., after the first, third and fourth folds 126, 138, 140). All such variations and modifications, including those discussed hereinabove, are intended to be included within the scope of the invention.

While the present invention has been described with reference to the particular exemplary embodiments, it is not to be restricted by such embodiments, but only by the appended claims.

What is claimed is:

1. A folding platform for forming a folded food product made from a flexible shell, said platform comprising a base having an upper surface and an elongate edge formed along a side of said upper surface of said base; a first flap having an upper surface, a first elongate edge formed along a first side of said upper surface of said first flap, and a second elongate edge formed along a second side of said upper surface of said first flap opposite said first side thereof, said first flap being pivotally attached to said base along a first axis including said elongate edge of said base and said first elongate edge of said first flap; and a second flap having an upper surface and a first elongate edge formed along a first side of said upper surface of said second flap; said second flap being pivotally attached to said first flap along a second axis including said second elongate edge of said first flap and said first elongate edge of said second flap; said folding platform being adapted to assume a substantially open configuration so as to permit a flexible food product shell to be draped across said first and second flaps and said upper surface of said base, and a food filling portion to be deposited on said shell above said base proximate said first axis; said first and second flaps being adapted to rotate about said first axis in a first rotational direction relative to said base so as to cause a side portion of the shell, initially draped across said first and second flaps, to overlay the food filling portion deposited on said base; said second flap being adapted to rotate about said second axis in said first rotational direction relative to said first flap; and said second flap being further adapted, via said second flap rotating about said second axis in said first rotational direction relative to said first flap, to form an elongate fold in the overlaying shell side portion, and to tuck the elongate fold beneath the food filling portion opposite said first axis.

2. The folding platform of claim 1, wherein said second flap further includes a second elongate edge formed along a second side of said upper surface of said second flap opposite said first side thereof, and folding means disposed along said second elongate edge of said second flap for said forming and said tucking of the elongate fold in the overlaying shell side portion.

3. The folding platform of claim 2, wherein said folding means includes a ridge formed along said second elongate edge of said second flap.

4. The folding platform of claim 3, wherein said ridge includes a protruding edge for said forming of the elongate fold and said tucking of the elongate fold underneath the food filling portion.

5. The folding platform of claim 4, wherein said protruding edge of said ridge is shaped so as to extend at least partially in the direction of said first axis via said second flap rotating about said second axis in said first rotational direction relative to said first flap.

6. The folding platform of claim 1, wherein said ridge includes a concave surface for forming the overlaying shell side portion around the food filling portion.

7. The folding platform of claim 1, further comprising stopping means for limiting an extent to which said first and second flaps are permitted to rotate about said first axis in said first rotational direction relative to said base.

8. The folding platform of claim 7, wherein said stopping means includes respective opposing contact surfaces on said first flap and said base which meet when said first and second flaps reach a predetermined rotational limit about said first axis relative to said base in said first rotational direction.

9. The folding platform of claim 8, wherein said respective opposing contact surfaces are disposed adjacent said first axis.

10. The folding platform of claim 8, further comprising a hinge pintle disposed between said first and second flaps and along said second axis, and wherein said respective opposing contact surfaces include a surface of said hinge pintle.

11. The folding platform of claim 1, further comprising stopping means for limiting an extent to which said second flap is permitted to rotate about said second axis in said first rotational direction relative to said first flap.

12. The folding platform of claim 11, wherein said stopping means include respective opposing contact surfaces on said first and second flaps which meet when said second flap reaches a predetermined rotational limit about said second axis relative to said first flap.

13. The folding platform of claim 12, wherein said respective opposing contact surfaces are disposed adjacent said second axis.

14. The folding platform of claim 13, further comprising additional stopping means for limiting an extent to which said second flap is permitted to rotate about said second axis in a second rotational direction relative to said first flap substantially opposite said first rotational direction.

15. The folding platform of claim 14, wherein said additional stopping means includes respective opposing contact surfaces on said first and second flaps which meet when said second flap reaches a predetermined rotational limit about said second axis relative to said first flap.

16. The folding platform of claim 15, further comprising retracting means for rotating said second flap to said predetermined rotational limit in said second rotational direction after said second flap has formed the elongate fold and tucked the elongate fold underneath the food filling portion.

17. The folding platform of claim 16, wherein said retracting means includes a spring.

18. The folding platform of claim 17, wherein said spring is a leaf spring.

19. The folding platform of claim 17, wherein said spring is a coil spring.

20. The folding platform of claim 19, further comprising a hinge pintle disposed between said first and second flaps and along said second axis, and wherein said coil spring is coiled around said hinge pintle.

21. The folding platform of claim 1, further comprising a cam follower coupled to said second flap and extending therefrom in a direction substantially coincident with a plane offset from, and extending parallel to, said second axis.

22. The folding platform of claim 21, wherein said direction of extension of said cam follower from said second flap is substantially tangential relative to an arc described by said second flap rotating in said first rotational direction about said second axis.

23. In a folding platform for folding a side portion of a flexible shell of a folded food product over a food filling portion deposited on the flexible shell, said platform comprising a base having an elongate edge, and a folding flap having a first elongate edge and a second elongate edge opposite said first elongate edge, said folding flap being pivotally attached to said base along said elongate edge of said base and said first elongate edge of said folding flap so as to permit said folding flap to rotate in a first rotational direction relative to said base and thereby cause the side portion of the flexible shell, initially draped across said folding flap, to overlay a food filling portion deposited on the flexible shell above said base, the improvement wherein said folding flap is divided between a first flap segment coextensive with said first elongate edge, and a second flap segment coextensive with said second elongate edge and pivotally attached to said first flap segment intermediate said first and second elongate edges so as to permit said second flap segment to rotate in said first rotational direction relative to said first flap segment, said second flap segment being adapted, via said rotation of said second flap segment in said first rotational direction relative to said first flap segment, to form an elongate fold in the overlaying side portion of the flexible shell, and to tuck the elongate fold underneath the food filling portion opposite said first elongate edge of said folding flap.

24. The folding platform of claim 23, wherein said second flap segment further includes folding means disposed along said second elongate edge of said second flap segment for said forming and said tucking of the elongate fold in the overlaying shell side portion.

25. The folding platform of claim 24, wherein said folding means includes a ridge formed along said second elongate edge of said second flap segment.

26. The folding platform of claim 25, wherein said ridge includes a protruding edge for said forming of the elongate fold and said tucking of the elongate fold underneath the food filling portion.

27. The folding platform of claim 26, wherein said protruding edge of said ridge is shaped so as to extend at least partially in the direction of said elongate edge of said base via said second flap segment rotating in said first rotational direction relative to said first flap segment.

28. The folding platform of claim 25, wherein said ridge includes a concave surface for forming the overlaying shell side portion around the food filling portion.

* * * * *